United States Patent [19]
Prodan et al.

[11] Patent Number: 5,825,242
[45] Date of Patent: Oct. 20, 1998

[54] MODULATOR/DEMODULATOR USING BASEBAND FILTERING

[75] Inventors: Richard S. Prodan, Boulder; Thomas H. Williams, Longmont, both of Colo.

[73] Assignee: Cable Television Laboratories, Louisville, Colo.

[21] Appl. No.: 576,809

[22] Filed: Dec. 21, 1995

Related U.S. Application Data

[63] Continuation of Ser. No. 222,800, Apr. 5, 1994, abandoned.

[51] Int. Cl.⁶ .............................. H03D 1/24; H04L 27/38; H04L 27/36; H03C 1/52
[52] U.S. Cl. ..................... 329/304; 329/357; 329/361; 329/363; 332/103; 332/115; 375/321; 375/324; 375/261; 375/270; 348/726; 455/47; 455/109
[58] Field of Search ..................................... 332/103, 104, 332/115, 151; 329/304, 306, 341, 343, 357, 358, 361, 363; 455/47, 109, 204; 348/725, 726, 724; 375/321, 324, 350, 261, 270

[56] References Cited

U.S. PATENT DOCUMENTS

| | | | |
|---|---|---|---|
| 3,887,768 | 6/1975 | Forney, Jr. et al. ................. | 375/269 |
| 4,123,710 | 10/1978 | Stuart et al. ........................ | 375/263 |
| 4,253,067 | 2/1981 | Caples et al. ................... | 455/214 X |
| 4,965,536 | 10/1990 | Yoshida ............................. | 332/103 |
| 5,177,455 | 1/1993 | Bennett ............................. | 332/103 |
| 5,477,199 | 12/1995 | Montreuil ......................... | 332/103 |

*Primary Examiner*—Robert Pascal
*Assistant Examiner*—Arnold Kinkead
*Attorney, Agent, or Firm*—Meltzer, Lippe Goldstein, et al.

[57] ABSTRACT

A modulation and demodulation scheme for video signals may be used for HDTV signals using VSB-PAM, analog NTSC signals using VSB-AM and digital video signals using QAM. VSB-PAM modulation and demodulation may be performed using in-phase and quadrature baseband filters. By adjusting the filter taps, a single modulator structure may be used for QAM and VSB-PAM modulation. Similarly, a single demodulator structure may be used for QAM and VSB-PAM demodulation. This demodulator may also be used for VSB-AM modulation.

25 Claims, 15 Drawing Sheets

FREQUENCY RESPONSE
(INPHASE)

FREQUENCY RESPONSE dB
(INPHASE)

IMPULSE RESPONSE
(INPHASE)

FREQUENCY RESPONSE
(QUADRATURE)

FREQUENCY RESPONSE dB
(QUADRATURE)

IMPULSE RESPONSE
(QUADRATURE)

FIG. 13

******** FIR FILTER DESIGN ********

PASSBAND FROM 0 TO 0.225 Hz
STOPBAND BEGINS AT 0.275 Hz
ROLLOFF FACTOR IS 0.1
PASSBAND RIPPLE IS 0.00273812
STOPBAND ATTENUATION IS -51.251 dB

******************************************

INPHASE [h(-n) = h(n)]
FILTER COEFFICIENT VALUES:
h(0)  = 0.2500000
h(1)  = 0.1588871
h(2)  = 0.0
h(3)  =-0.0521450
h(4)  = 0.0
h(5)  = 0.0301412
h(6)  = 0.0
h(7)  =-0.0204626
h(8)  = 0.0
h(9)  = 0.0149848
h(10) = 0.0
h(11) =-0.0112968
h(12) = 0.0
h(13) = 0.0084693
h(14) = 0.0
h(15) =-0.0066259
h(16) = 0.0
h(17) = 0.0047418
h(18) = 0.0
h(19) =-0.0036301
h(20) = 0.0
h(21) = 0.0027044
h(22) = 0.0
h(23) =-0.0019213
h(24) = 0.0
h(25) = 0.0013845
h(26) = 0.0
h(27) =-0.0009622
h(28) = 0.0
h(29) = 0.0006495
h(30) = 0.0

FIG. 14

******** FIR FILTER DESIGN ********

PASSBAND FROM 0 TO 0.225 Hz
STOPBAND BEGINS AT 0.275 Hz
ROLLOFF FACTOR IS 0.1
PASSBAND RIPPLE IS 0.00273812
STOPBAND ATTENUATION IS -51.251 dB

******************************************

QUADRATURE [h(-n) =-h(n)]
FILTER COEFFICIENT VALUES:
h(0)  = 0.0
h(1)  = 0.1588871
h(2)  = 0.1578726
h(3)  = 0.0521450
h(4)  = 0.0
h(5)  = 0.0301412
h(6)  = 0.0491576
h(7)  = 0.0204626
h(8)  = 0.0
h(9)  = 0.0149848
h(10) = 0.0257822
h(11) = 0.0112968
h(12) = 0.0
h(13) = 0.0084693
h(14) = 0.0148264
h(15) = 0.0066259
h(16) = 0.0
h(17) = 0.0047418
h(18) = 0.0086207
h(19) = 0.0036301
h(20) = 0.0
h(21) = 0.0027044
h(22) = 0.0046464
h(23) = 0.0019213
h(24) = 0.0
h(25) = 0.0013845
h(26) = 0.0023532
h(27) = 0.0009622
h(28) = 0.0
h(29) = 0.0006495
h(30) = 0.0009983

FIG. 17

******** FIR FILTER DESIGN ********

PASSBAND FROM 0 TO 0.2 Hz
STOPBAND BEGINS AT 0.3 Hz
ROLLOFF FACTOR IS 0.2
PASSBAND RIPPLE IS 0.00136906
STOPBAND ATTENUATION IS -51.2716 dB

*****************************************

FILTER COEFFICIENT VALUES:
h(0)  = 0.5
h(1)  = 0.3157451
h(2)  = 0.0
h(3)  =-0.0983151
h(4)  = 0.0
h(5)  = 0.0515645
h(6)  = 0.0
h(7)  =-0.0296528
h(8)  = 0.0
h(9)  = 0.0172413 h(10) = 0.0
h(11) =-0.0092928
h(12) = 0.0
h(13) = 0.0047063
h(14) = 0.0
h(15) =-0.0019966

MODULATOR/DEMODULATOR USING BASEBAND FILTERING

RELATED APPLICATION

This is a continuation of patent application Ser. No. 08/222,800 filed on Apr. 5, 1994.

FIELD OF THE INVENTION

The present invention relates to a modulator and demodulator used for the transmission and reception of information signals such as digital and analog video signals. Specifically, the present invention relates to a vestigial sideband (VSB) modulator and demodulator which utilizes in-phase and quadrature baseband filters. The present invention also relates to a modulator and demodulator which can be used for vestigial sideband-pulse amplitude modulation (VSB-PAM), as well as for Quadrature Amplitude Modulation (QAM). In addition, for video applications, the present invention provides a single demodulator structure which can demodulate QAM signals, VSB-PAM signals and VSB-AM signals, such as conventional NTSC video.

BACKGROUND OF THE INVENTION

A conventional QAM modulator 10 for a video signal is illustrated in FIG. 1. The QAM modulator 10 has a first input 12 and a second input 14. The input 12 receives an in-phase baseband signal $m_I(k)$, where k is a discrete time variable. The baseband signal $m_I(k)$, where k is a discrete time variable. The input 14 receives a quadrature baseband input signal $m_Q(k)$. For example, both $m_I(k)$ and $m_Q(k)$ can take on one of four discrete symbol values in each symbol period T (e.g., −3, −1, +1, +3). The baseband information signals $m_I(k)$ and $m_Q(k)$ are filtered by the baseband digital filters 16 and 18 which operate at twice the symbol period by inserting zero values in between the symbol values. The outputs of the filters 16 and 18 are designated $m_I'(k)$ and $m_Q'(k)$. The signals $m_I'(k)$ and $m_Q'(k)$ are converted to analog form by the D/A (digital-to-analog) converters 20 and 22 clocked at twice the symbol rate to generate $m_I'(t)$ and $m_Q'(t)$ after low pass filtering by the low pass filters 21 and 23. The local oscillator 24 outputs a carrier signal $\cos\omega_o t$, where $\omega_o$ is the frequency of an intermediate frequency (IF) band carrier. A phase shifter 26 shifts the output of the local oscillator 24 by 90° to generate the carrier $\sin\omega_o t$. The multiplier 28 multiplies $m_I'(t)$ and $\cos\omega_o t$. The multiplier 30 multiplies $m_Q'(t)$ and $\sin\omega_o t$. The two products are summed by the summer 32 to obtain the IF band signal r(t). A further frequency upshifting takes place through use of the local oscillator 34 and multiplier 36. The local oscillator 34 generates a radio frequency (RF) band carrier $\cos\omega_c t$. The radio frequency band carrier is multiplied with r(t) using the multiplier 36 to produce r'(t). The signal r'(t) is then processed by a conventional image rejection filter 35 and transmitted via a channel to a demodulator.

A conventional QAM demodulator 40 is illustrated in FIG. 2. The QAM demodulator 40 receives the RF signal r'(t). The signal r'(t) is downshifted into the IF frequency band to reproduce r(t) using the local oscillator 42 which generates $\cos\omega_c t$, the multiplier 44, and the low pass filter 46. The baseband signals $m_I'(t)$ and $m_Q'(t)$ are then regenerated using the local oscillator 48 which generates the IF carrier $\cos\omega_o t$. The IF signal r(t) is multiplied by $\cos\omega_o t$ in the multiplier 50 and filtered by the low pass filter 52 in the I channel 51 to regenerate $m_I'(t)$. Similarly, to regenerate $m_Q'(t)$, the IF carrier is phase shifted by 90° in the phase shifter 54. Then $\sin\omega_o t$ is multiplied with r(t) using the multiplier 56 in the Q channel 53. The result is filtered by the low pass filter 58 to reproduce $m_Q'(t)$. The baseband analog signals $m_I'(t)$ and $m_Q'(t)$ are then converted to digital signals $m_I'(k)$ and $m_Q'(k)$ using the A/D (analog-to-digital) converters 60 and 62. The signals $m_I'(k)$ and $m_Q'(k)$ are then filtered using the baseband filters 64 and 66 and sampled at the symbol period T using the samplers 65 and 67 to reproduce $m_I(k)$ and $m_Q(k)$.

The combined transfer function of the I-channel filters 16 (see FIG. 1) and 64 (see FIG. 2) is designated $H(\omega)$. The combined transfer function of the Q-channel filters 18 (see FIG. 1) and 64 (see FIG. 2) is also $H(\omega)$. The I channel transfer function may be partitioned so that it is entirely at the modulator (in which case filter 64 may be omitted) or entirely at the demodulator (in which case filter 16 may be omitted) or may be partitioned between the modulator and demodulator. Similarly, the Q channel transfer function may be partitioned so that it is entirely at the modulator, entirely at the demodulator, or partitioned between the modulator and demodulator.

Another form of modulation which may be used is single sideband (SSB) modulation. Before SSB is discussed the following should be noted. Consider the message signal m(t). The frequency domain representation of this signal $M(\omega)$ is illustrated in FIG. 3. As can be seen in FIG. 3, the signal $M(\omega)$ has a bandwidth W. When the signal m(t) is upshifted by modulation of m(t) onto an IF band carrier with frequency $\omega_o$, the bandwidth is 2W centered around $\omega_o$ as shown in FIG. 4. In single sideband modulation, either the lower sideband 70 or the upper sideband 72 of the double sideband (DSB) signal of FIG. 4 is suppressed. FIG. 5A shows the spectrum after suppression of the lower sideband.

One form of SSB modulator 70 is illustrated in FIG. 5. In FIG. 5, the baseband digital video message signal m(k) is converted to analog form by the D/A converter 72 and low pass filtered using the low pass filter 73 to produce the analog message signal m(t). The message signal m(t) is then frequency upshifted into the IF band using the local oscillator 74 and multiplier 76. The result is a signal with a frequency spectrum such as that shown in FIG. 4 with a bandwidth of 2W. To reduce the bandwidth to W, the single sideband filter 78 is utilized. The filter 78 has a passband from $\omega_o$ to $\omega_o+W$ if the upper sideband is to be transmitted and a passband from $\omega_o-W$ to $\omega_o$ if the lower sideband is to be transmitted. The output of the filter 78 is the single sideband signal r(t) which is an IF band signal. The IF band signal r(t) is then upshifted to the RF band using the local oscillator 80 which generates the RF band carrier $\cos\omega_c t$ and the multiplier 82 to form the RF band signal r'(t). A conventional image rejection filter (not shown in FIG. 5) is used to filter r'(t).

Another form of SSB modulator 90 is illustrated in FIG. 6. An input video data signal m(k) is directed into an I (In-phase) channel 92 and a Q (quadrature) channel 94. The signal in the Q-channel 94 is subjected to a Hilbert transform using conventional Hilbert Transform circuit 98. The signals in both channels are then converted to analog form using the D/A converters 100 and 102 and low pass filters 101 and 103. The local oscillator 104 generates an IF band carrier signal $\cos\omega_o t$ which is shifted 90° by the phase shifter 106 to form $\sin\omega_o t$. The I-channel baseband signal is upshifted into the IF band using the multiplier 108 which multiplies the I-channel baseband signal by $\cos\omega_o t$. The Q-channel baseband signal is upshifted into the IF band using the multiplier 110 which multiplies the Q-channel baseband signal by $\sin\omega_o t$. The outputs of the multipliers 108 and 108 are summed by the summer 112 to form the IF band signal r(t). The signal r(t) is then upshifted into the RF band through use of the local oscillator 114 which generates the RF carrier $\cos\omega_c t$ and the multiplier 116 which outputs the RF band signal r'(t). The signal r'(t) is then filtered by a conventional image rejection filter (not shown) and transmitted to a remote location.

It should be noted that in FIG. 6, if the summer 112 performs addition, the lower sideband is suppressed, and if the summer 112 performs subtraction, the upper sideband is suppressed.

The SSB techniques described in connection with FIG. 5 and FIG. 6 both have significant shortcomings. The SSB filter 78 of FIG. 5 is very hard to implement practically because the sharp cutoff at $\omega=\omega_o$ cannot be synthesized exactly. Thus, there is a problem at the low frequency portion of the baseband signal. Similarly, in the modulator of FIG. 6, the Hilbert transform circuit 98 cannot be implemented exactly and there is significant distortion of the low frequency modulating components.

The vestigial sideband pulse amplitude modulation (VSB-PAM) technique may be used to overcome the shortcomings of the SSB technique. VSB-PAM is derived by filtering DSB in such a fashion that one sideband is passed completely while just a trace or vestige of the other sideband remains. A conventional VSB-PAM modulator is illustrated in FIG. 7. The VSB-PAM modulator 120 of FIG. 7 is identical to the SSB modulator 70 of FIG. 5 except that the VSB filter 99 replaces the SSB filter 78.

The transfer function of the SSB and VSB filters 78, 99 are illustrated in FIG. 8. As shown in FIG. 8, the SSB filter has a sharp cut-off at $\omega=\omega_o$. This is very hard to implement in practice. The exact shape of the transfer function of the VSB filter is not critical, but the VSB filter transfer function has a response such that $$H(\omega_o-\omega_o')+H(\omega_o+\omega')=2H(\omega_o)$$

However, the VSB modulation technique described above also has certain shortcomings. Specifically, the VSB filter is an IF or RF band filter which is implemented using filter devices such as inductor-capacitor (L-C) filters, surface-acoustic-wave (SAW) filters, helical filters, or stripline filters.

In view of the foregoing, it is an object of the present invention to provide a VSB-PAM modulator and demodulator which utilizes baseband filtering rather than an IF or RF VSB filter.

Another form of modulation which is used for video signals is VSB-AM. The VSB-AM modulation technique is used for conventional analog NTSC video.

An NTSC VSB-AM modulator 150 is shown in FIG. 8A. The analog video baseband signal m(t) is upshifted into the IF band using the local oscillator 152 which generates the IF band carrier $\cos\omega_o t$, and the AM modulator 154. The resulting IF band signal is then filtered by the VSB-AM filter 156 to produce the IF band signal r(t). The transfer function of the VSB-AM filter 156 is shown by the solid curve A of FIG. 8B. The frequency domain representation of the signal outputted by the AM modulator 154 is indicated by curve B in FIG. 8B. Note that the curve A is not symmetric with respect to the IF band carrier frequency $\omega_o$.

Returning now to FIG. 8A, the IF band signal r(t) is upshifted to the RF band using the local oscillator 159 which generates an RF band carrier $\cos\omega_c t$, and the multiplier 158 which multiplies r(t) by $\cos\omega_c t$ to form the IF band signal r'(t). The signal r'(t) is filtered by a conventional image rejection filter 160 and then broadcast to a plurality of receivers.

FIG. 8C illustrates a conventional NTSC demodulator 160. The RF band signal is downshifted to the IF band using a local oscillator 161 which generates $\cos\omega_o t$, the multiplier 162, and the low pass filter 163. The multiplier 162 multiplies r'(t) and $\cos\omega_o t$. The low pass filter 163 filters harmonics of the RF carrier $\omega_c$ to regenerate r(t). The signal r(t) is filtered by the VSB-AM filter 164. The resulting signal is downshifted to the baseband using the local oscillator which generates the IF band carrier, the AM demodulator 166, and the low pass filter 167, which eliminates harmonics of the IF carrier, to regenerate the baseband signal m(t).

The transfer function of the filter 164 of FIG. 8C is indicated by the curve A of FIG. 8D. The frequency domain representation of the signal r(t) which is inputted to the filter 164 is indicated by the curve B in FIG. 8D.

A further object of the invention is as follows. It is now expected that HDTV (High Definition Television) signals will be transmitted using VSB-PAM. However, as indicated above, conventional analog NTSC television signals are transmitted using VSB-AM. In addition, it is expected that digital television signals will be transmitted using QAM. It is expected that a typical user will simultaneously have access to some HDTV channels using VSB-PAM and some conventional analog NTSC channels which are transmitted using VSB-AM. The user will also have access to some digital TV channels transmitted using QAM. It is therefore an object of the invention to provide a single integrated demodulator which can perform QAM, VSB-AM, and VSB-PAM demodulation.

SUMMARY OF THE INVENTION

In accordance with one aspect of the invention a unique VSB-PAM modulator is disclosed. This modulator eliminates the need for a VSB IF or RF band filter and instead uses baseband filtering. An input message signal which undergoes VSB modulation is divided into an I-(In phase) signal and a Q (quadrature) signal. The I and Q signals are filtered by baseband filters (whose transfer functions are discussed in detail below). The filtered I and Q signals are then multiplied by in phase and quadrature carriers (e.g., $\cos\omega_o t$ and $\sin\omega_o t$) and the result is summed to produce a VSB signal. Illustratively, $\omega_o$ is a carrier in the IF band. The inventive VSB modulator may also include further circuity (i.e., local oscillator and multiplier) for translating the signal up to the RF band.

In a preferred embodiment, the I and Q baseband filters are implemented as linear phase Finite Impulse Response (FIR) filters which means that the filtering takes place in the digital domain.

The VSB signal may be demodulated as follows. The RF band signal is first stepped down to the IF band. The IF band signal is then divided into an I channel signal and a Q channel signal. The I-channel signal is multiplied by $\cos\omega_o t$ and processed by a low pass analog filter to form an I-channel baseband signal. The Q-channel signal is multiplied by $\sin\omega_o t$ and filtered by a low pass analog filter to form a Q-channel baseband signal. The I and Q channel baseband signals are then converted to digital form and filtered using digital baseband filters which preferably are linear phase FIR filters.

The overall transfer function of the baseband filters in the in-phase channel of the inventive VSB modulator and demodulator is denoted $G_I(\omega)$. The transfer function $G_I(\omega)$ may be partitioned so that the entire transfer function $G_I(\omega)$ is located in the modulator or the entire transfer function $G_I(\omega)$ is located in the demodulator or the transfer function $G_I(\omega)$ may be partitioned between the modulator and demodulator. Similarly, the baseband filters in the quadrature channel of the inventive modulator and demodulator may be partitioned so that the entire transfer function $G_Q(\omega)$ is located in the modulator, the demodulator, or partitioned between the two. When expressed as a function of filter tap number n, the transfer function of the in-phase channel filters $g_I(n)$ is even symmetric about the center tap and the transfer function $g_Q(n)$ of the quadrature channel filters is odd symmetric about the center tap.

It may now be noted that both a QAM modulator and demodulator and a VSB-PAM modulator and demodulator may be implemented through use of baseband FIR filters. In accordance with a second aspect of the invention, this permits a single modulator structure to be used as a-QAM modulator or a VSB-PAM modulator by varying the filter coefficients of the FIR baseband filters. Similarly, a single demodulator structure may be used as a QAM demodulator or VSB-PAM demodulator by varying the filter coefficients. Preferably, the change in filter coefficients can be accomplished automatically under the control of a controller such as a microprocessor. This permits a significant advantage in that a user's television set may be provided with a single demodulator which can demodulate both QAM and VSB signals. Moreover, the inventive demodulator can also be used to demodulate VSB-AM signals. As is shown in detail below, this can be accomplished using the same filter coefficients in the demodulator as in the VSB-PAM case.

The inventive demodulator is particularly useful as it enables a television receiver unit to receive analog NTSC channels modulated using VSB-AM, digital video channels modulated using QAM, and HDTV channels modulated using VSB-PAM.

BRIEF DESCRIPTION OF THE DRAWING

FIG. 13 is a list of tap weights for a FIR filter which implements $G_I(\omega)$.

FIG. 14 is a list of tap weights for an FIR filter which implements $G_Q(\omega)$.

FIG. 17 is a list of tap weights for a transfer function h(n).

DETAILED DESCRIPTION OF THE INVENTION

Figure 9:
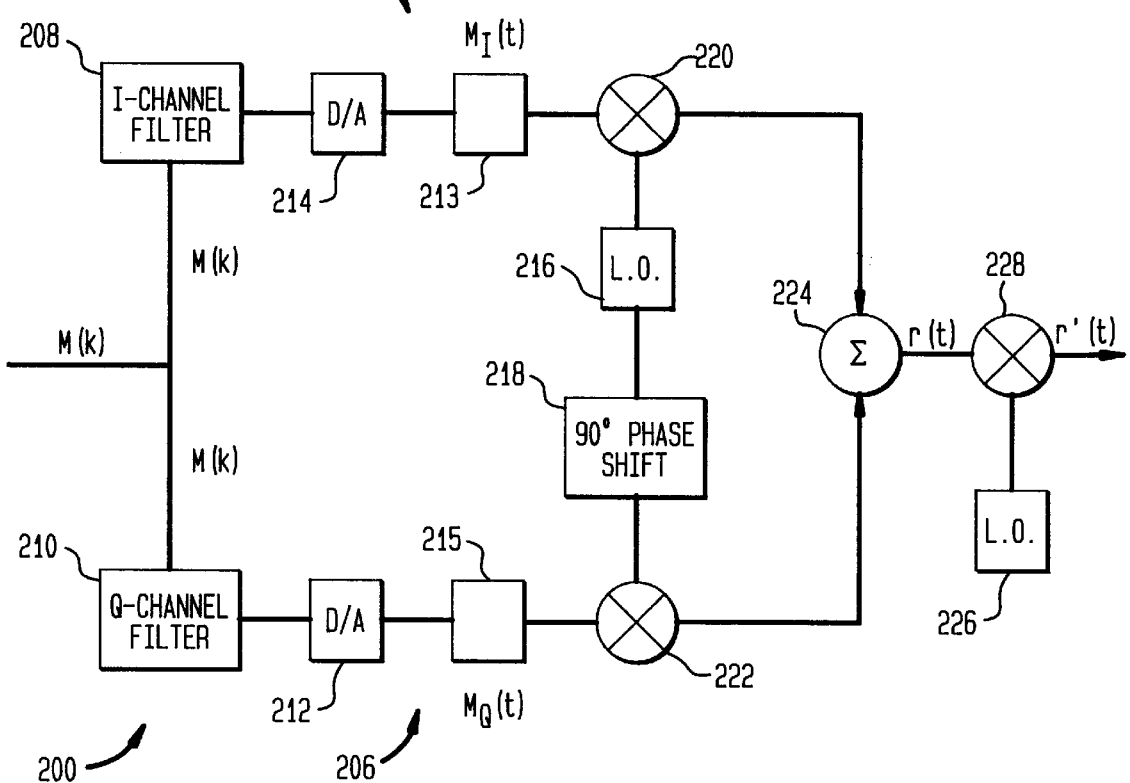
FIG. 9 schematically illustrates a VSB-PAM modulator according to the present invention.

A VSB modulator 200 in accordance with the invention is illustrated in FIG. 9. An input symbol stream m(k) enters into an I-channel 204 and a Q-channel 206. The I-channel 204 includes a baseband filter 208 for processing the I-channel symbols. The Q-channel 206 includes a baseband filter 210 for processing the Q-channel symbols. The outputs of the filters 208, 210 are converted to analog form by the D/A converters 212, 214 (and low pass filters 213, 215) to produce the analog signals $m_I(t)$ and $m_Q(t)$. The local oscillator 216 produces the IF band in-phase carrier $\cos\omega_o t$. The 90° phase shifter 218 phase shifts the output of the local oscillator 216 to produce the IF band quadrature carrier $\sin\omega_o t$. The multiplier 220 multiplies $m_I(t)$ and $\cos\omega_o t$. The multiplier 222 multiplies $m_Q(t)$ and $\sin\omega_o t$. The products are summed by the summer 224 to produce the IF band VSB signal r(t). The local oscillator 226, which produces an RF band carrier $\cos\omega_c t$, and the multiplier 228 are used to translate r(t) into the RF band, thereby producing the RF band signal r'(t). The signal r'(t) may be processed by a conventional image rejection filter (not shown).

Figure 7:
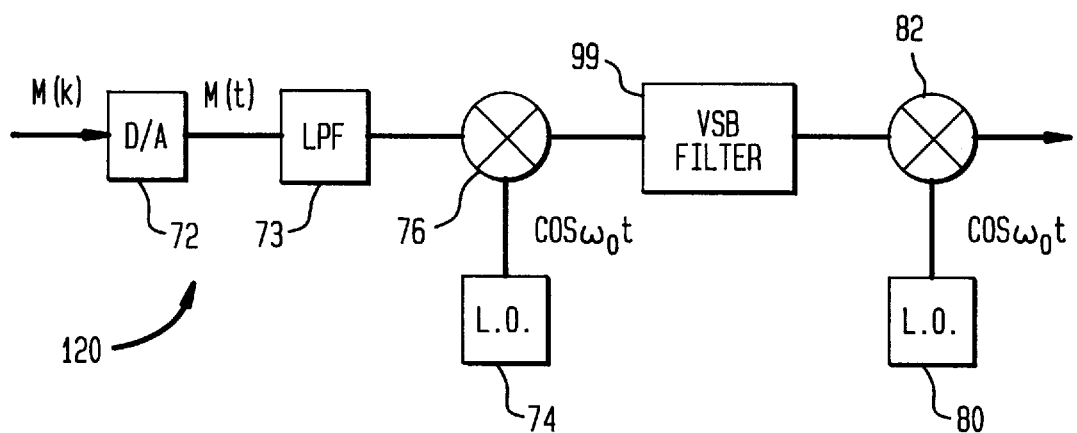
FIG. 7 schematically illustrates a prior art VSB-PAM modulator.
Figure 8:
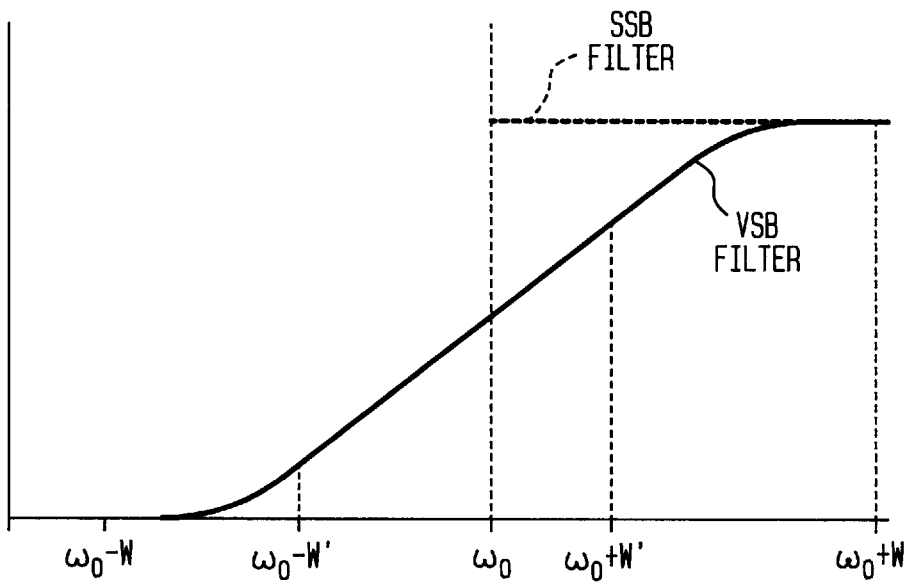
FIG. 8 schematically illustrates a transfer function of a VSB filter used in the prior art VSB-PAM modulator of FIG. 7.
Figure 8A:
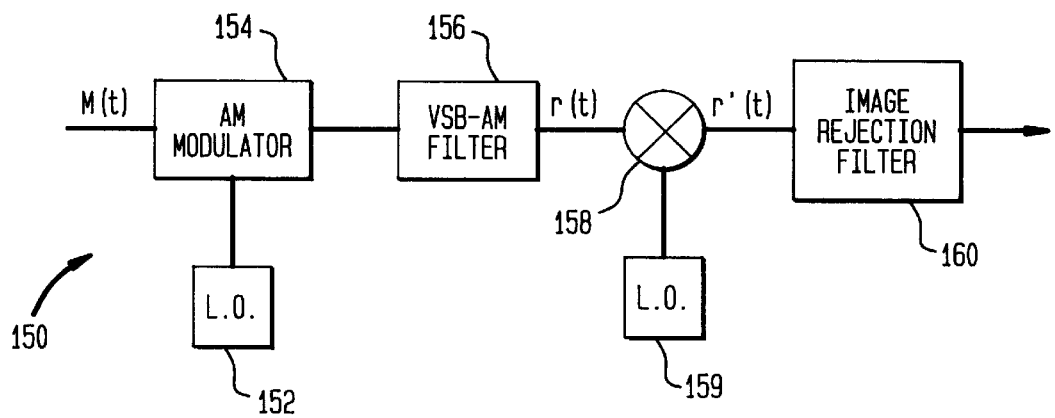
FIG. 8A schematically illustrates a conventional VSB-AM modulator used for an analog NTSC signal.
Figure 8B:
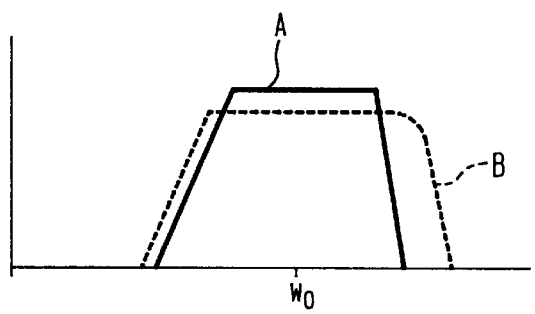
FIG. 8B illustrates the transfer function of a VSB-AM filter using in the modulator of FIG. 8A.
Figure 8D:
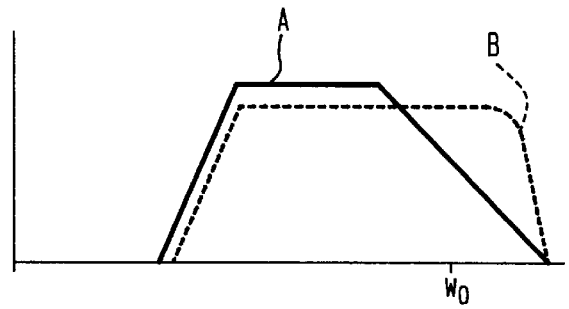
FIG. 8D illustrates the transfer function of a VSB-AM filter used in the demodulator of FIG. 8C.
Figure 8C:
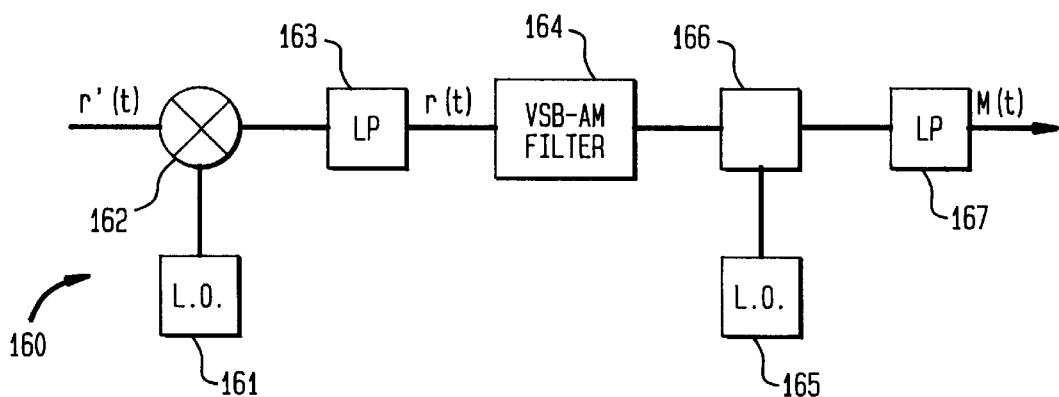
FIG. 8C schematically illustrates a conventional VSB-AM demodulator used for an analog NTSC signal.

It should be noted that there is no IF or RF band VSB filter such as the filter 99 of FIG. 7. Instead, the baseband filters 208, 210 are used.

Figure 10:
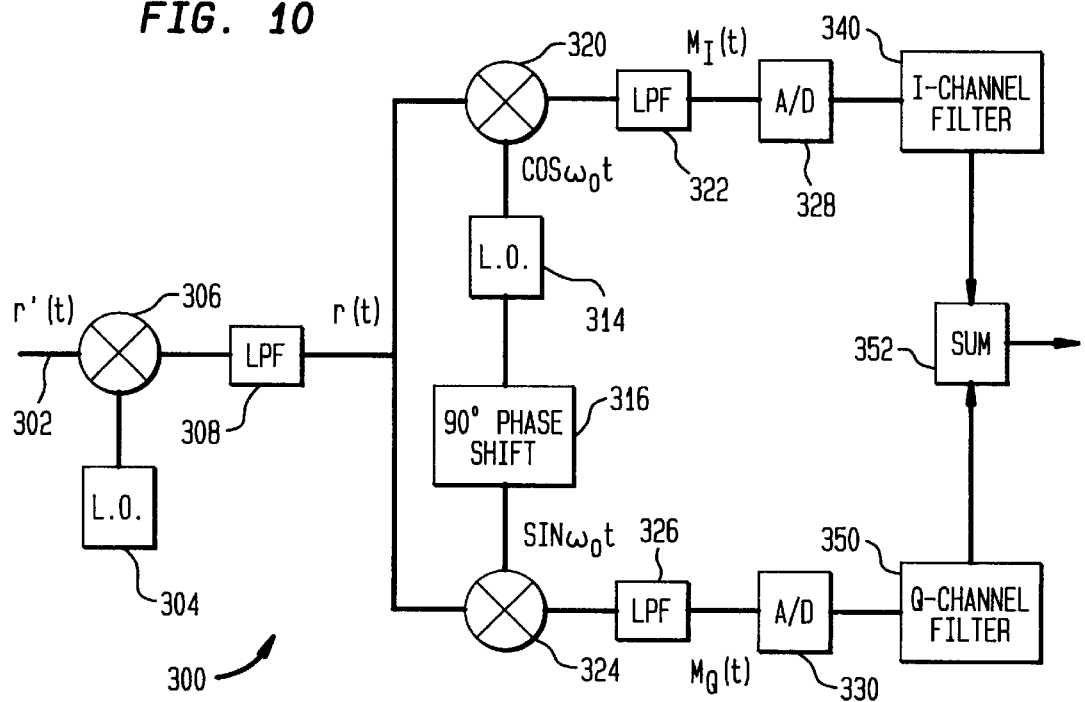
FIG. 10 schematically illustrates a VSB-PAM demodulator according to the present invention.

A VSB demodulator 300 according to the invention is illustrated in FIG. 10. The demodulator 300 receives the RF band signal r'(t) at the input 302. This signal is downshifted to the IF band using the local oscillator 304 which generates $\cos\omega_c t$, the multiplier 306, and the low pass filter 308. The low pass filter 308 suppresses harmonics of the RF carrier frequency $\omega_c$ and outputs the IF band signal r(t). The signal r(t) is distributed to the I-channel 310 and the Q-channel 312. A local oscillator 314 generates $\cos\omega_o t$. This is phase shifted by the phase shifter 316 which outputs $\sin\omega_o t$. The multiplier 320 multiplies r(t) and $\cos\omega_o t$. The result is low pass filtered by the filter 322 to suppress harmonics of the IF band carrier $\omega_o$ and to reproduce the I-channel baseband signal $m_I(t)$. The multiplier 324 multiplies r(t) by $\sin\omega_o t$. The result is low pass filtered by the filter 326 to suppress harmonics of the IF band carrier $\omega_o$ and to reproduce the Q-channel baseband signal $m_Q(t)$. The signals $m_I(t)$ and $m_Q(t)$ are reconverted to digital form by the A/D converters 328 and 330.

The I-channel and Q-channel signals are filtered by the I-channel and Q-channel baseband filters 340 and 350. The outputs are then summed by the summer 352 to reconstruct the original symbol stream.

The I-channel filters 208 (see FIG. 9) and 340 (see FIG. 10) have a combined transfer function $G_I(\omega)$. This transfer function may be implemented totally by the modulator filter 208, in which case the demodulator filter 340 is omitted, or implemented totally by the demodulator filter 340, in which case the modulator filter 208 is omitted. Alternatively, the transfer function $G_I(\omega)$ may be partitioned into a product $G_I(\omega) = G_{Im}(\omega)\,G_{Id}(\omega)$ where $G_{Im}(\omega)$ is implemented at the filter 208 and $G_{Id}(\omega)$ is implemented at the filter 340. Preferably $G_{Im}(\omega) = G_{Id}(\omega)$. Similarly, the Q channel filters 210 (see FIG. 9) and 350 (see FIG. 10) have a combined transfer function $G_Q(\omega)$. This transfer function may be implemented totally by the modulator filter 210, in which case the demodulator filter 350 is omitted, or implemented totally by the demodulator filter 350, in which case the modulator filter 210 may be omitted. Alternatively, the transfer function $G_Q(\omega)$ may be partitioned into a product $G_Q(\omega) = G_{Qm}(\omega) \cdot G_{Qd}(\omega)$ where $G_{Qm}(\omega)$ is implemented at the filter 210 and $G_{Qd}(\omega)$ is implemented at the filter 350. Preferably, $G_{Qm}(\omega) = G_{Qd}(\omega)$.

Figure 11:
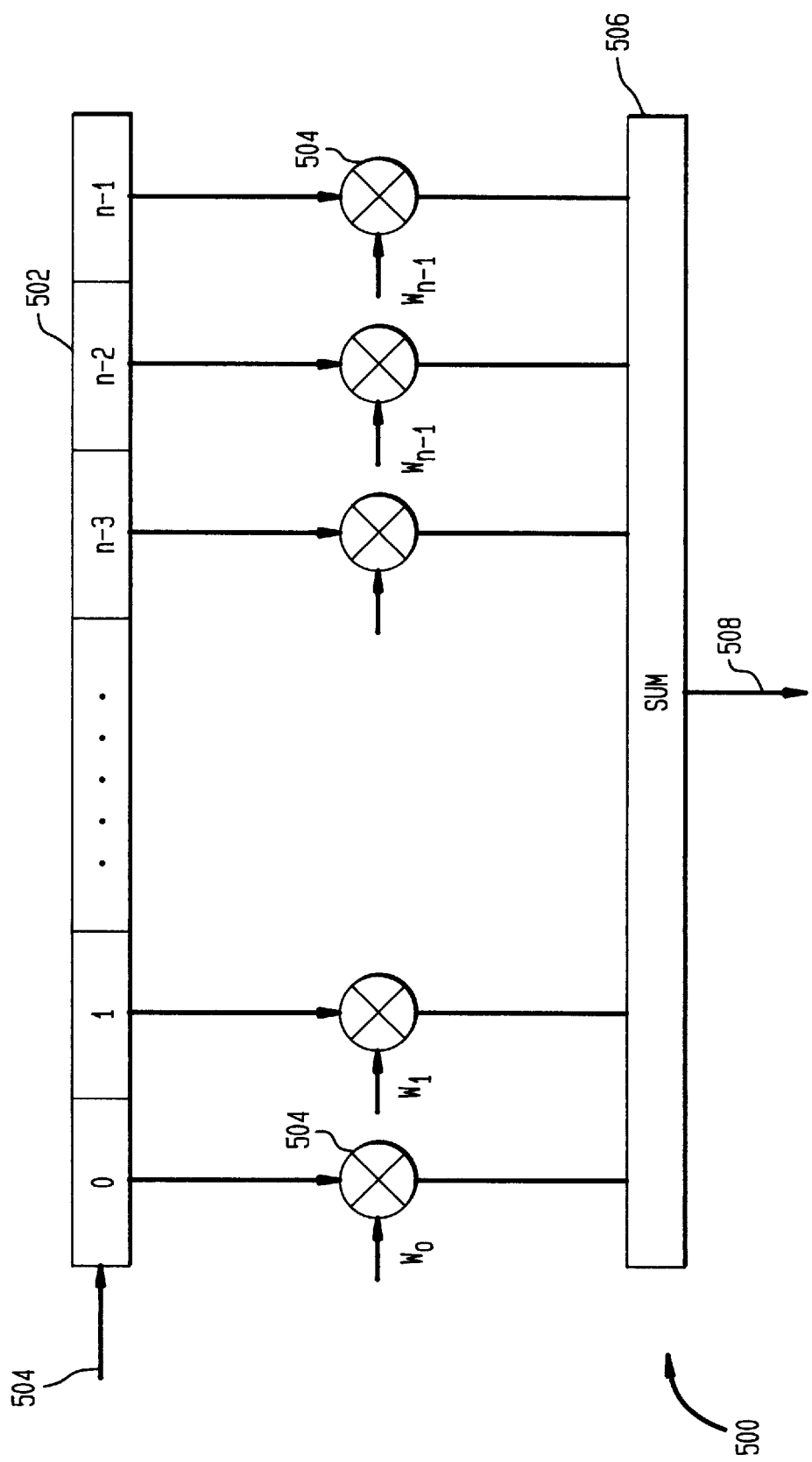
FIG. 11 schematically illustrates an FIR filter.
Figure 11A:
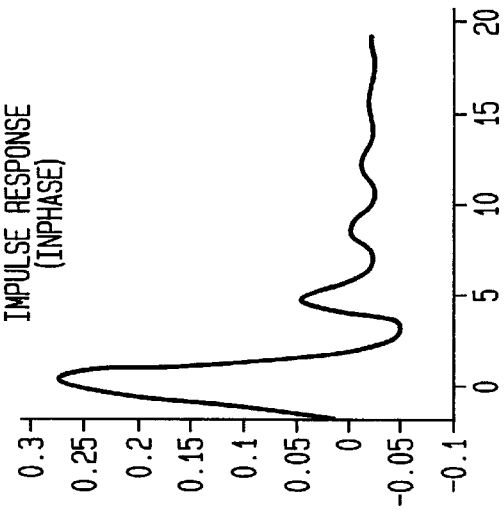
FIG. 11A illustrates the in-phase transfer function $G_I(\omega)$ for the modulator of FIG. 9 and demodulator of FIG. 10.
Figure 11B:
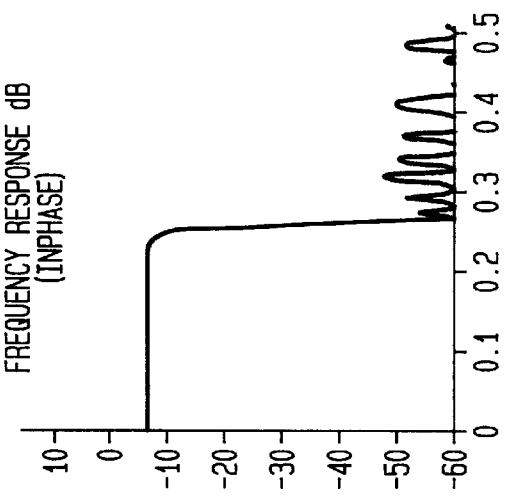
FIG. 11B illustrates the transfer function $G_I(\omega)$ in dB.
Figure 11C:
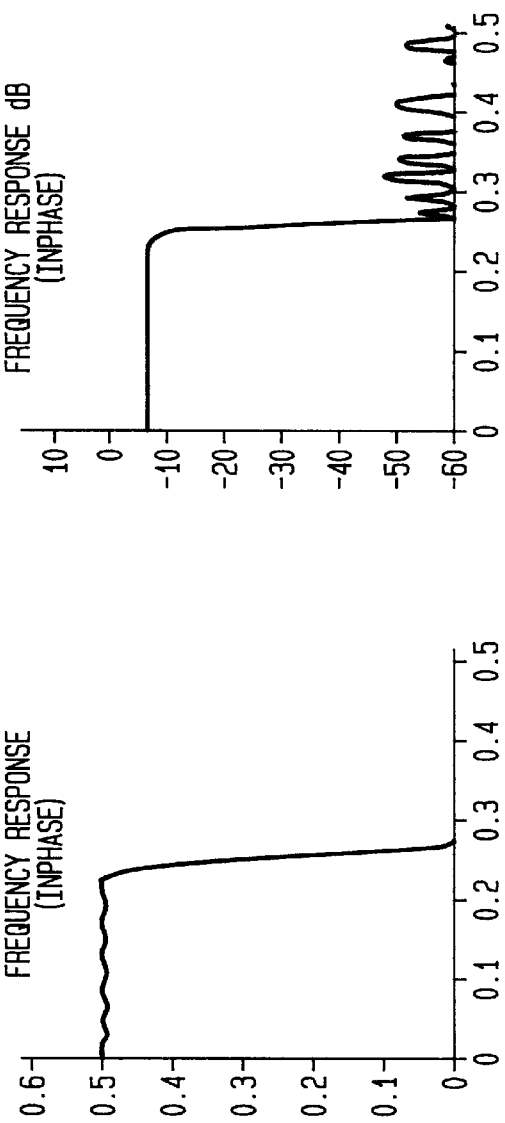
FIG. 11C illustrates the impulse response of a filter with the transfer function $G_I(\omega)$.
Figure 12A:
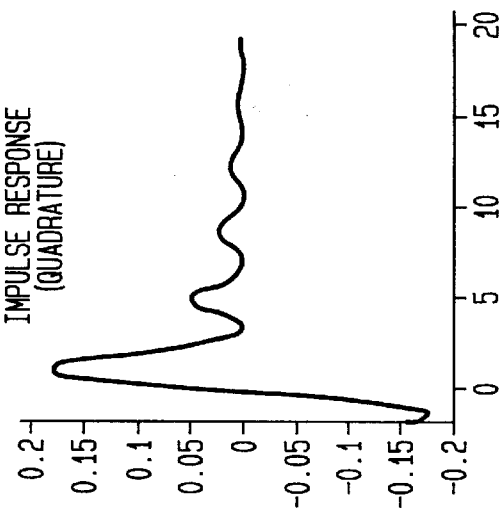
FIG. 12A illustrates the quadrature transfer function $G_Q(\omega)$ for the modulator of FIG. 9 and the demodulator of FIG. 10.
Figure 12B:
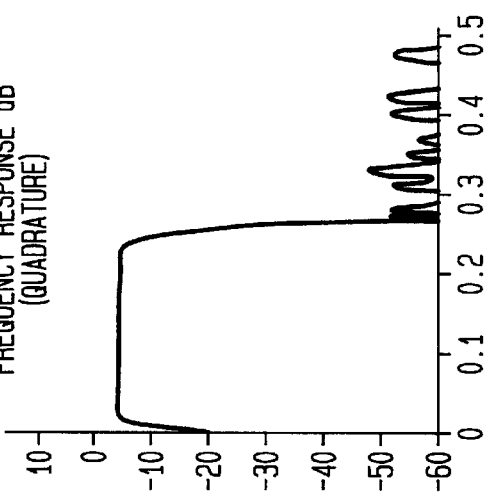
FIG. 12B illustrates the transfer function $G_Q(\omega)$ in dB.
Figure 12C:
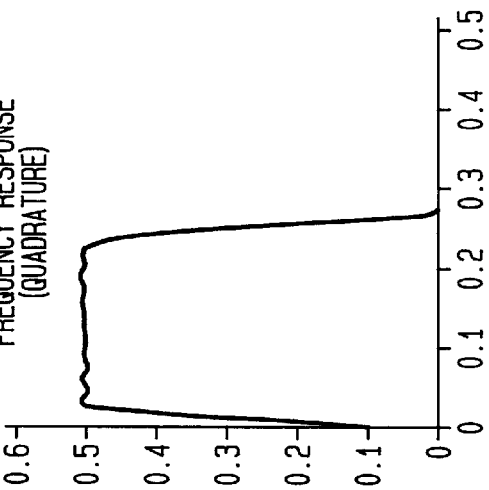
FIG. 12C illustrates the impulse response of the filter with the transfer function $G_Q(\omega)$.

FIG. 11A is a plot of an exemplary transfer function $G_I(\omega)$. FIG. 11B illustrates the transfer function $G_I(\omega)$ in dB. FIG. 11C illustrates the impulse response of a filter with a transfer function $G_I(\omega)$. It should be noted that $G_I(\omega)$ is purely real and has an even symmetry with respect to $\omega=o$. FIG. 12A is a plot of an exemplary transfer function $G_Q(\omega)$. FIG. 12B illustrates $G_Q(\omega)$ in dB. FIG. 12C is the impulse response of a filter with a transfer function $G_Q(\omega)$. The function $G_Q(\omega)$ is purely imaginary and has an odd symmetry about $\omega=o$.

The filters 208, 210, 340, 350 may be implemented as FIR filters. An FIR filter is schematically illustrated in FIG. 11. The FIR filter 500 of FIG. 11 comprises a shift register 502 with positions, 0, 1, 2, ..., N−2, N−1. The symbols to be filtered arrive at input 504 and in each succeeding cycle the inputted symbols are shifted one position to the right.

In each cycle, each of the symbols stored in the shift register 502 is multiplied by a tap weight $w_o, w_1, \ldots, w_{N-2}, w_{N-1}$ using a multiplier 504. The products are summed using the summer to generate an output symbol at 508.

FIG. 13 is a list of tap weights for an FIR filter with N=61 which implements $G_I(\omega)$ of FIG. 11A. FIG. 14 is a list of tap weights for an FIR filter with N=61 which implements $G_Q(\omega)$ of FIG. 12A.

Figure 15:
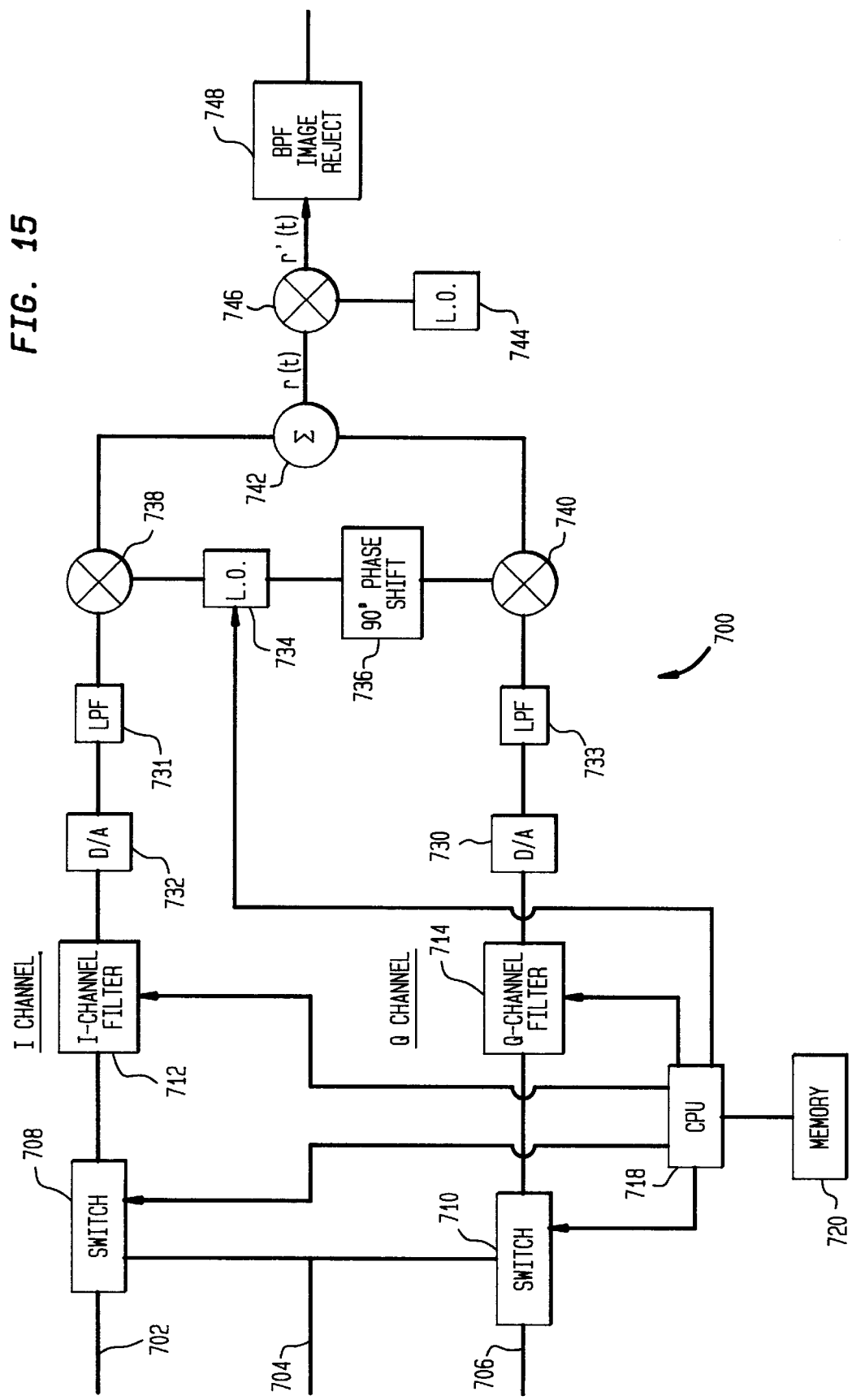
FIG. 15 illustrates a modulator which can perform QAM and VSB-PAM modulation in accordance with the invention.
Figure 16:
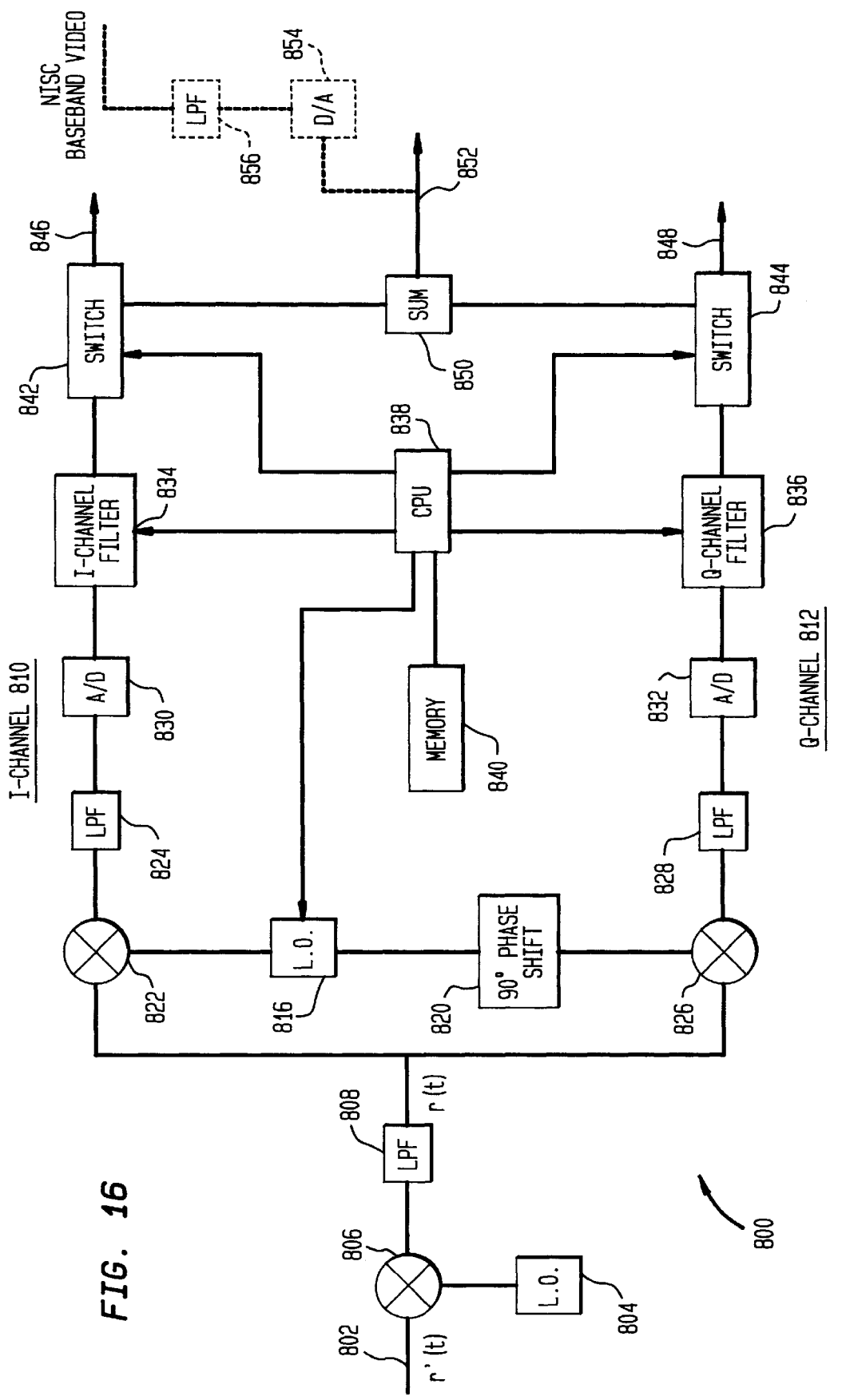
FIG. 16 illustrates a demodulator which can perform QAM, VSB-PAM, and VSB-AM demodulation.

In accordance with the invention, the baseband filters in a QAM modulator or demodulator and a VSB-PAM modulator or demodulator may both be implemented using FIR filters. It is thus possible to form a single modulator structure which can perform QAM modulation and VSB-PAM modulation. Such a single modulator structure is shown in FIG. 15. It is also possible to form a single demodulator structure which can demodulate both QAM and VSB-PAM. Such a demodulator structure is shown in FIG. 16.

Figure 1:
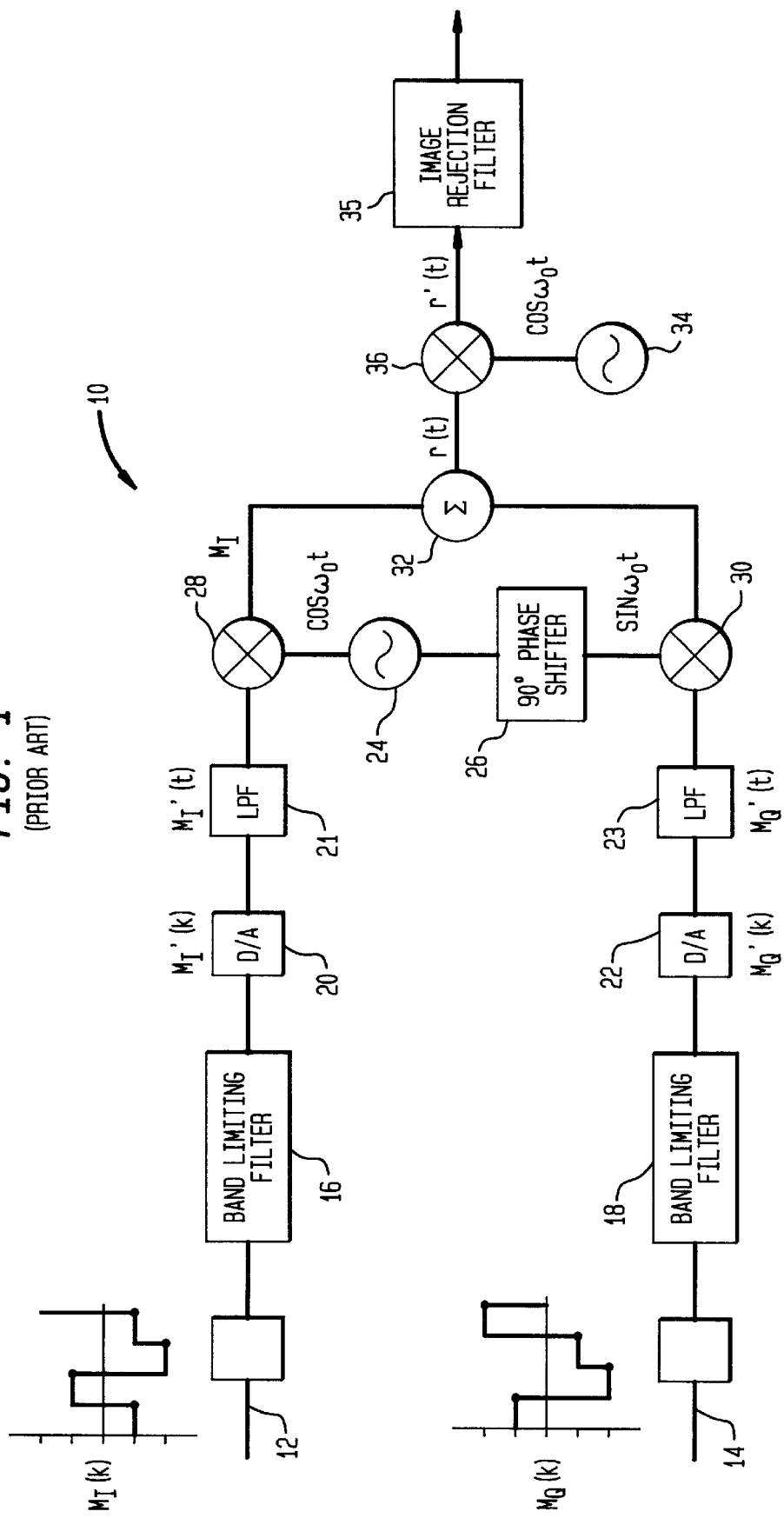
FIG. 1 schematically illustrates a conventional QAM modulator.
Figure 2:
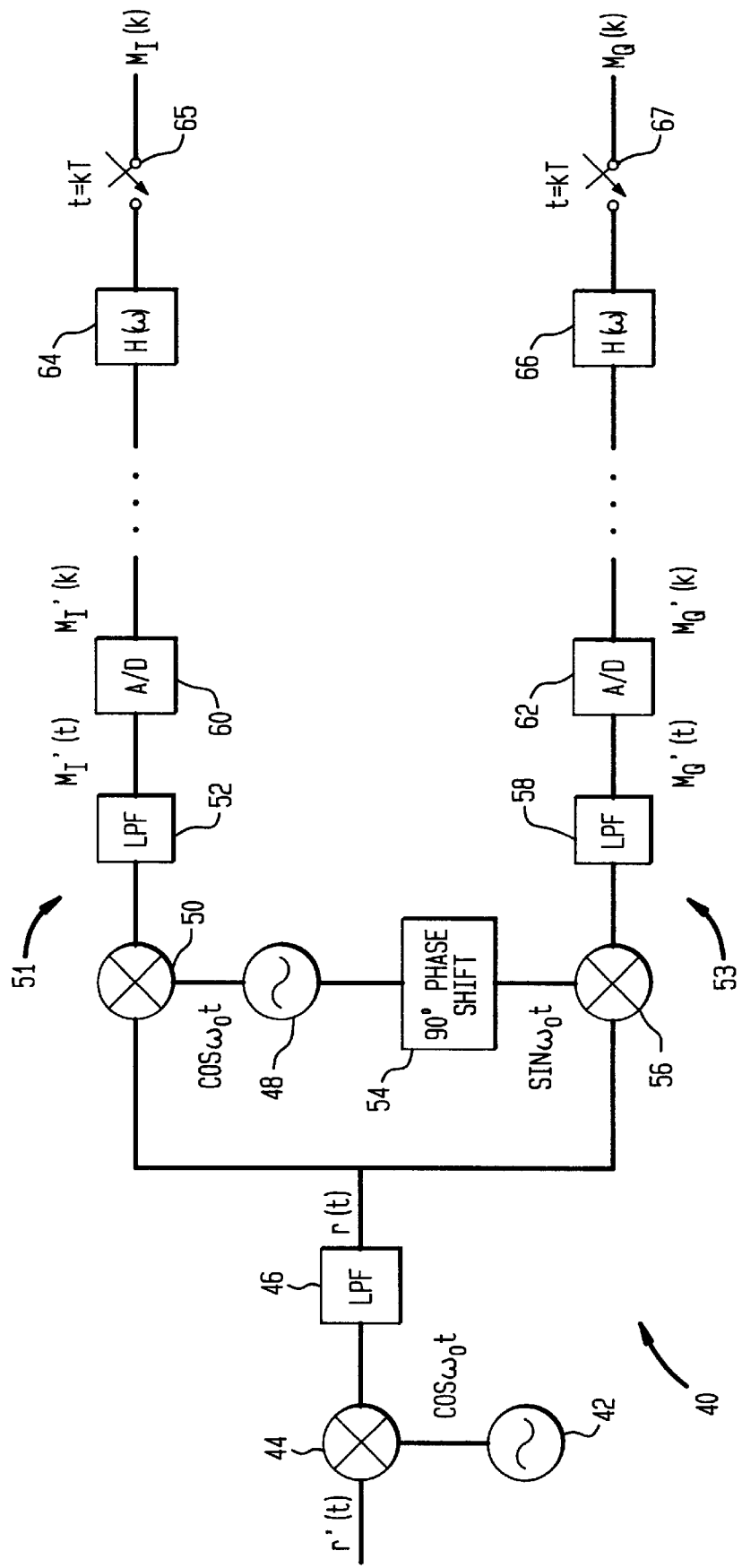
FIG. 2 schematically illustrates a conventional QAM demodulator.
Figure 3:
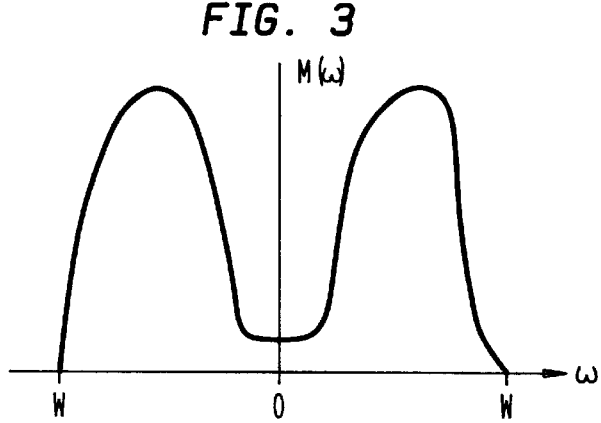
FIG. 3 illustrates the frequency spectrum of a message.
Figure 4:
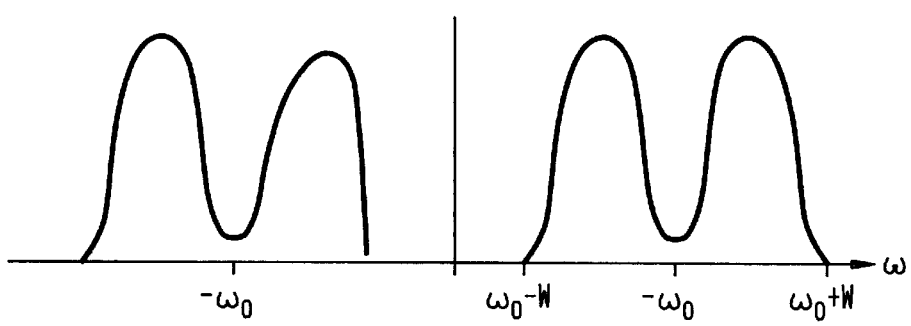
FIG. 4 illustrates the frequency spectrum of the message of FIG. 3 after DSB modulation onto a carrier.
Figure 5:
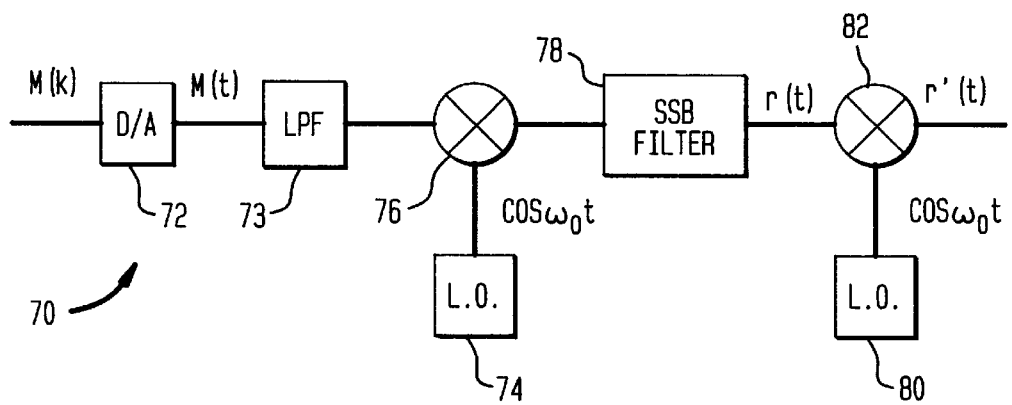
FIG. 5 schematically illustrates a first SSB modulator.
Figure 5A:
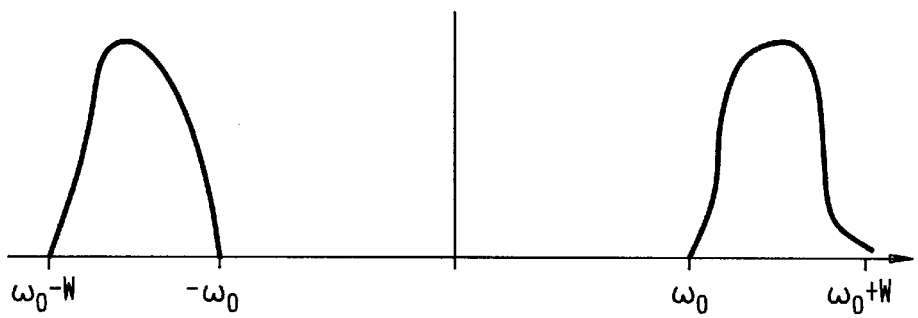
FIG. 5A illustrates the frequency spectrum of FIG. 4 after suppression of one sideband.
Figure 6:
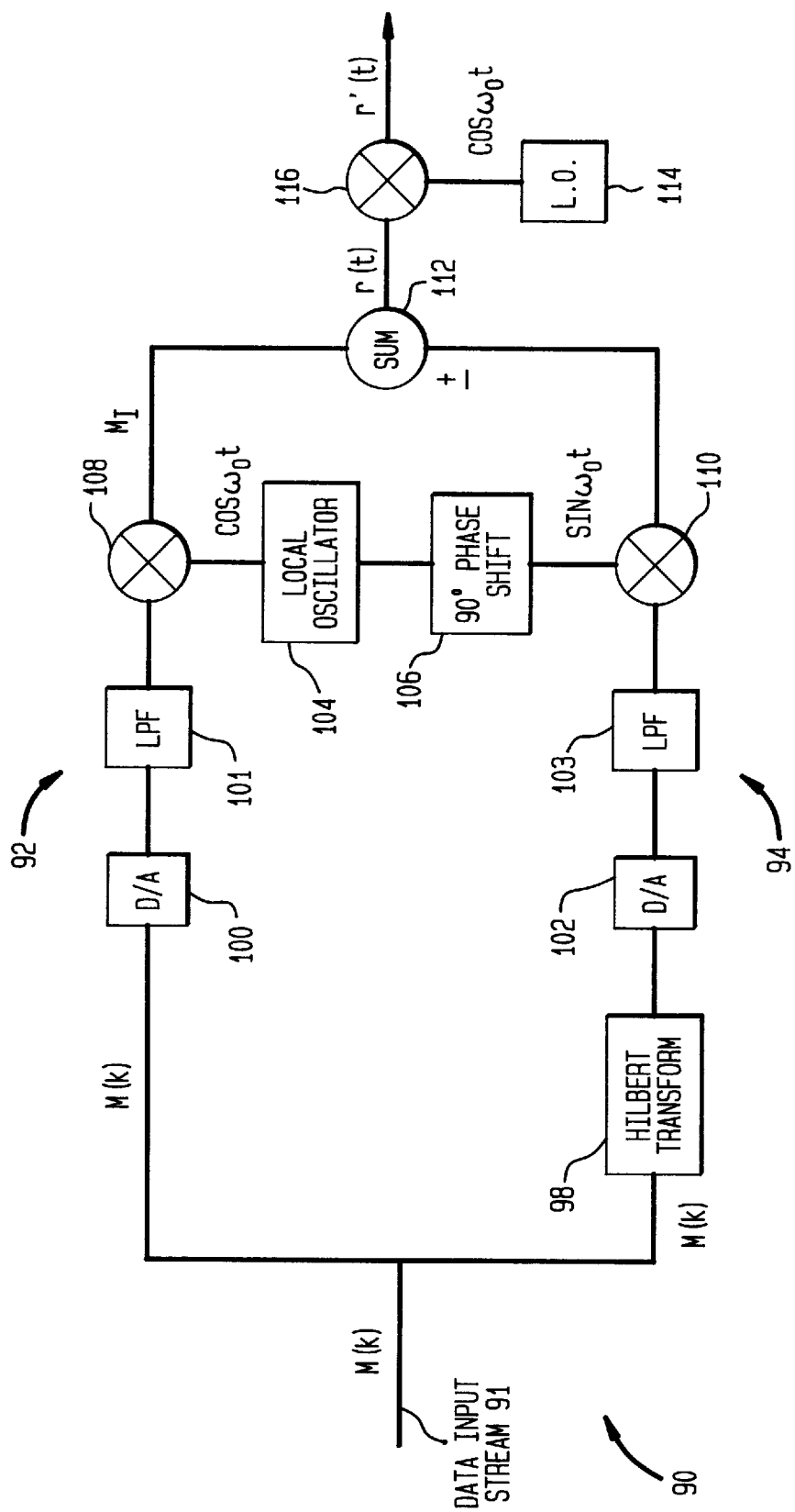
FIG. 6 schematically illustrates a second SSB modulator.

More specifically, in a QAM modulator and demodulator, the combined transfer function of the I-channel baseband filter in the modulator (e.g., filter 16 of FIG. 1) and the I-channel baseband filter in the demodulator (e.g., filter 64 of FIG. 2) is H($\omega$). Similarly, the combined transfer function of the Q-channel baseband filter in the modulator (e.g., filter 18 of FIG. 1) and the Q-channel baseband filter in the demodulator (e.g., filter 66 of FIG. 2) is also H($\omega$). FIG. 17 is a list of tap weights for an N=31 FIR filter which has an illustrative transfer function H($\omega$). The function H($\omega$) has even symmetry with respect to $\omega=0$. From the function H($\omega$), it is possible to derive $G_I(\omega)$ and $G_Q(\omega)$, the baseband filter transfer functions for the VSB-PAM modulator and demodulator.

The following steps are used to derive $G_I(\omega)$ and $G_Q(\omega)$ from H($\omega$). The steps are explained by representing H($\omega$), $G_I(\omega)$ and $G_Q(\omega)$ as h(n), $g_I(n)$, and $g_Q(n)$, respectively, where n is a tap number in a FIR filter. In the FIR filter of FIG. 11, n=0, 1, 2, ..., N−2, N−1.

1) $h_2(n) = \uparrow 2h(n)$. This means that h(n) is up sampled by a factor of two by inserting zero tap weights between the tap weights of h(n). That is:

h(n)=h(0), h(1) 2, ..., h(N−2), h(N−1)

$h_2(n)$=h(0), 0, h(1), 0, ..., 0, h(N−2), 0, h(N−1)

2) $h_3(N) = h(N)^* \, h_2(N)$

3) $h_4(n) = h_3(n) e^{j\pi n/4}$ where $\pi$ is the digital Nyquist frequency

4) $g_I(n) = R_e\{h_4(n)\}$

5) $g_Q(n) = I_m\{h_4(n)\}$

When h(n) is implemented by an FIR filter having the tap weights shown in FIG. 17, steps (1)–(5) above result in the tap weights for $g_I(n)$ and $g_Q(n)$ shown in FIGS. 13 and 14.

A modulator which can be used for VSB-PAM and QAM is illustrated in FIG. 15. The modulator 700 of FIG. 15 has three inputs 702, 704, 706. When the modulator 700 is used as a QAM modulator a baseband I-channel signal arrives via input 702 and a baseband Q channel signal arrives via input 706. The switches 708 and 710 are set in a manner to pass the I and Q-channel baseband signals to the I-channel and Q-channel baseband filters 712 and 714. Preferably, the filters 712 and 714 are linear phase FIR filters.

When the modulator 704 is used for a VSB signal, the baseband signal arrives on input 704. Note that the symbol rate of the signals in inputs 702 and 706 is half the symbol rate of a signal on input 704. The VSB-PAM baseband signal at input 704 is passed to both the I-channel and the Q-channel. The states of the switches 708 and 710 are set to pass the symbols from the input 704 to the I-channel and Q channel baseband filters 712 and 714.

The states of the switches 708 and 710 are controlled by the controller 718, which illustratively is a CPU, depending on whether VSB-PAM or QAM is selected. In addition, the memory 720 connected to the CPU stores the tap weights for the filters 712 and 714. Depending on whether VSB-PAM or QAM is selected, a particular set of tap weights is automatically applied to the filters 712 and 714 from the memory 720 by the CPU 718.

After processing by the filters 712 and 714 the signals in the I and Q channels are converted to analog form by the D/A converters 730 and 732. The low pass filters 731 and 733 remove harmonics induced by the D/A conversion. A local oscillator 734 generates an in-phase IF band carrier $\cos\omega_o t$. The $\cos\omega_o t$ signal is shifted 90° by the phase shifter 736 to generate an IF band quadrature carrier $\sin\omega_o t$. The frequency $\omega$ of the local oscillator is controlled by the CPU so that different frequencies can be used for QAM and VSB. For example, for QAM the frequency may be 44 MHz and for VSB-PAM the frequency may be 46.69 MHz. The in-phase baseband signal is multiplied by $\cos\omega_c t$ using multiplier 738. The quadrature baseband signal is multiplied by $\sin\omega_o t$ using the multiplier 740. The results are summed using the summer 742 to generate an IF band modulated signal r(t). This IF band signal is then shifted to the RF band using the local oscillator 744 which generates an RF carrier and the multiplier 746. The output of the multiplier 746 r'(t) may be filtered by a conventional image rejection filter 748.

A demodulator 800 which can demodulate VSB or QAM modulated signals is shown in FIG. 16. The modulator 800 receives a RF band QAM or VSB signal r'(t) on the input 802. The local oscillator 804 generates the RF carrier $\cos\omega_c t$. The multiplier 806 multiplies $\cos\omega_c t$ with the RF input signal r'(t). The low pass filter removes harmonics of the RF carrier $\omega_c$ and outputs the IF signal r(t).

The signal r(t) is distributed to the I-channel 810 and the Q-channel 812. A local oscillator 816 generates the in-phase IF carrier, e.g., $\cos\omega_o t$. The phase shifter 820 provides a 90° phase shift to generate the IF band quadrature carrier $\sin\omega_o t$. The multiplier 822 multiplies r(t) and $\cos\omega_o t$. The product is then filtered by the low pass filter 824 which removes harmonics of $\omega_o$ and outputs an I-channel baseband signal. Similarly, the multiplier 826 multiplies r(t) and $\sin\omega_o t$. The product is then filtered by the low pass filter 828 to remove harmonics of $\omega_o$ and to output a Q-channel baseband signal. The I-channel and Q-channel baseband signals are then converted to digital form by the A/D converters 830,832. The I-channel and Q-channel baseband signals are then filtered by the FIR filters 834 and 836.

The demodulator 800 includes controller 838 (e.g., a CPU) and a memory 840. The memory stores tap weights that are applied by the CPU to the filters 834 and 836 depending on whether the user selects a QAM or VSB channel. Optionally, the CPU 838 also controls the local oscillator 816 so that this oscillator outputs a carrier $\omega_o$ corresponding to the channel selected by the user.

The demodulator 800 also includes the switches 842 and 844. The state of the switches 842 and 844 are controlled by the CPU 838 depending on whether the user has selected a VSB or QAM channel. In the case of a QAM channel, independent I and Q signals are outputted at outputs 846 and 848. In the case of a VSB signal, the switches 842 and 844 set so that the outputs of the filters 834 and 836 are summed by the summer 850 and the result outputted at the output 852.

Figure 18A:
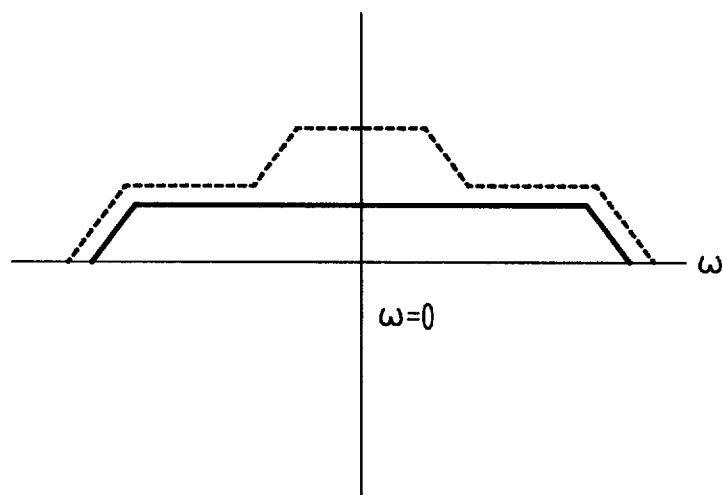
FIG. 18A illustrates the transfer function of the I-channel filter and the I-channel signal spectrum when the demodulator of FIG. 16 is used for VSB-AM demodulation.
Figure 18B:
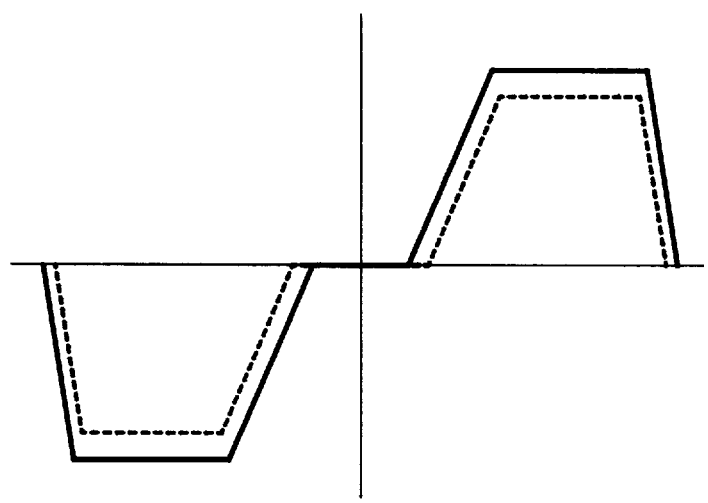
FIG. 18B illustrates the transfer function of the Q-channel filter and the channel signal when the demodulator of FIG. 16 is used for VSB-AM demodulation.

It is a significant feature of the invention that the modulator 800 can also demodulate a VSB-AM signal (as well as QAM and VSB-PAM signals). The filter coefficients of the filters 834 and 836 are the same for VSB-PAM and VSB-AM. However, the IF carrier frequency is different. For example, the IF carrier for VSB-PAM is 46.69 MHz and for VSB-AM it is 45.75 MHz. The IF carrier may be adjusted under the control of the CPU 838 depending on whether VSB-PAM or VSB-AM demodulation is performed. The demodulation of VSB-AM using the filters 834 and 836 may be understood in connection with FIGS. 18A and 18B. FIG. 18A shows the I-channel spectrum (dashed curve) and the I-channel filter transfer function (solid curve). FIG. 18B shows the Q-channel spectrum (dashed curve) and the Q-channel filter transfer function (solid curve). When the I and Q channel spectrums are summed the baseband signal is reconstructed.

In the case of VSB-AM, the baseband signal is converted to analog form using D/A converter 854. A low pass filter 856 removes harmonics resulting from the Digital-to-Analog (D/A) conversion. The output is NTSC baseband video.

In short, there has been disclosed a new modulation and demodulation scheme for video signals including HDTV signals using VSB-PAM, analog NTSC signals using VSB-AM, and digital video signals using QAM. In particular, according to the invention, VSB-PAM modulation and demodulation may be performed using in-phase and quadrature baseband filters. Preferably, the filters are linear phase FIR filters. By adjusting the filter taps, a single modulator structure may be used for QAM and VSB-PAM demodulation. Similarly, a single demodulator structure may be used for QAM and VSB-PAM demodulation. This demodulator may also be used for VSB-AM modulation.

Finally, the above-described embodiments of the invention are intended to be illustrative only. Numerous alternative embodiments may be devised by those skilled in the art without departing from the spirit and scope of the following claims.

What is claimed is:

1. A demodulator, comprising:
   (a) an input for receiving a signal having a particular type of modulation and including in-phase and quadrature modulated signal components;
   (b) a circuit configured to variably control a carrier frequency depending on the particular type of modulation of the received signal;
   (c) an in-phase channel including a downshifter responsive to the carrier frequency and configured to downshift the in-phase modulated component to form an in-phase baseband signal and a baseband filter for filtering the in-phase baseband signal;
   (d) a quadrature channel including a downshifter responsive to the carrier frequency and configured to downshift the quadrature modulated signal component to form a quadrature baseband signal and a baseband filter for filtering the quadrature baseband signal;
   (e) a summer for summing the filtered in-phase and quadrature baseband signals; and
   (f) said in-phase and quadrature baseband filters having transfer functions such that said demodulator outputs a baseband signal originally used to form said modulated signal.

2. The demodulator of claim 1, wherein said in-phase baseband filter is a linear phase FIR filter and said quadrature baseband filter is a linear phase FIR filter.

3. The demodulator of claim 2, wherein said in-phase baseband filter has a purely real even symmetric transfer function.

4. The demodulator of claim 2, wherein said quadrature baseband filter has a purely imaginary odd symmetric transfer function.

5. The demodulator of claim 1, wherein said VSB modulated signal is a VSB-PAM modulated signal.

6. The demodulator of claim 1, wherein said modulated signal is a VSB-AM signal.

7. A modulator for performing VSB-PAM or QAM modulation, comprising:
   (a) an in-phase channel configured to receive an in-phase baseband signal and including an in-phase baseband filter and a frequency upshifter configured to modulate the in-phase baseband signal onto an in-phase carrier;
   (b) a quadrature channel configured to receive a quadrature baseband signal and including a quadrature baseband filter and a frequency upshifter configured to upshift the quadrature baseband signal onto a quadrature carrier; and
   (c) a summer configured to sum the modulated in-phase and quadrature signals to generate a modulated output signal which is a QAM signal or a VSB-PAM signal;

(d) said in-phase and quadrature baseband filters being FIR filters, said modulator including a circuit for controlling tap weights of the FIR filters depending on whether the modulated output signal is a QAM signal or a VSB-PAM signal.

8. The modulator of claim 7, wherein:
(a) said in-phase and quadrature baseband signals are independent signals;
(b) said in-phase and quadrature baseband filters have the same transfer function which is purely real and even symmetric; and
(c) said modulated output signal is a QAM signal.

9. The modulator of claim 7, wherein:
(a) said in-phase and quadrature baseband signals are generated by distributing a single input baseband signal to said in-phase and quadrature channels;
(b) said in-phase filter has a transfer function which is purely real and even symmetric;
(c) said quadrature filter has a transfer function which is purely imaginary and which is odd symmetric; and
(d) said modulated output signal is a VSB-PAM signal.

10. The modulator of claim 7, wherein said modulator includes a circuit configured to control the frequency of said in-phase and quadrature carriers.

11. A demodulator which can demodulate a QAM signal, a VSB-PAM signal, and a VSB-AM signal, comprising:
(a) an input for receiving an input modulated signal which is a QAM signal, a VSB-PAM signal, or a VSB-AM signal;
(b) an in-phase channel for receiving said modulated signal from said input, and including a frequency downshifter configured to downshift said modulated signal to form an in-phase baseband signal and a baseband filter for filtering the in-phase baseband signal;
(c) a quadrature channel for receiving said modulated signal from said input and including a frequency downshifter configured to downshift said modulated signal to form a quadrature baseband signal and a baseband filter for filtering the quadrature baseband signal;
(d) an output for outputting a demodulated baseband signal; and
(e) said in-phase baseband filter and said quadrature baseband filter having transfer a circuit configured to control transfer functions of said in-phase and quadrature baseband filters depending on whether said input modulated signal is a QAM signal, a VSB-PAM signal, or a VSB-AM signal.

12. The demodulator of claim 11, wherein said transfer functions of said filters are the same for a VSB-AM or a VSB-PAM signal.

13. The demodulator of claim 11, wherein said demodulator includes a local oscillator and a controller being configured to control a frequency of the local oscillator depending on whether the input modulated signal is a QAM signal, a VSB-PAM signal, or a VSB-AM signal.

14. The demodulator of claim 11, wherein said baseband filters are FIR filters and said circuit controls tap weights of said FIR filters.

15. The demodulator of claim 11, wherein for a VSB-AM or a VSB-PAM signal said in-phase baseband filter has a purely real even symmetric transfer function and said quadrature baseband filter has a purely imaginary odd symmetric transfer function.

16. The demodulator of claim 11, wherein when said input modulated signal is a QAM signal, said output outputs independent in-phase and quadrature baseband signals.

17. The demodulator of claim 11, wherein when said input modulated signal is a VSB-PAM signal or VSB-AM said output is formed by summing the in-phase and quadrature baseband signals.

18. The demodulator of claim 11, wherein said input modulated signal is a VSB-AM signal and said output is an analog baseband signal.

19. The demodulator of claim 11, wherein said QAM signal is a digital video signal, said VSB-AM signal is an NTSC video signal, and said VSB-PAM signal is an HDTV video signal.

20. The demodulator of claim 11, further comprising:
(a) a first switch responsive to the circuit and configured to selectively connect an output of the in-phase channel baseband filter between an in-phase output and the summer; and
(b) a second switch responsive to the circuit configured to selectively connect the output of the quadrature channel baseband filter between a quadrature output and the summer.

21. A demodulator, comprising:
(a) an input for receiving an input modulated signal;
(b) downshifting circuitry for generating an in-phase baseband signal and a quadrature phase baseband signal;
(c) an in-phase baseband filter for filtering said in-phase baseband signal;
(d) a quadrature baseband filter for filtering said quadrature baseband signal;
(e) a circuit for varying the transfer functions of said in-phase baseband filter and quadrature baseband filter depending on a type of modulation used to generate said input modulated signal; and
(f) a local oscillator connected to the downshifting circuitry and responsive to the circuit to output a carrier frequency depending on the type of modulation used to generate said input modulated signals.

22. The demodulator of claim 21, wherein said input modulated signal is a QAM signal and said filter circuitry enables said in-phase and quadrature baseband filters to have even symmetric transfer functions.

23. The demodulator of claim 21, wherein said input modulated signal is a VSB signal and said filter circuitry enables said in-phase baseband filter to have a real even symmetric transfer function and said quadrature baseband filter to have an imaginary odd symmetric transfer function.

24. The demodulator of claim 23, wherein said filter circuitry varies said transfer functions of said filters by varying filter tap coefficients.

25. The demodulator of claim 21, further comprising:
(a) a first switch responsive to the circuit and configured to selectively connect an output of the in-phase channel baseband filter between an in-phase output and the summer; and
(b) a second switch responsive to the circuit and configured to selectively connect the output of the quadrature channel baseband filter between a quadrature output and the summer.

* * * * *